United States Patent
Matsunami et al.

(10) Patent No.: US 6,832,098 B1
(45) Date of Patent: Dec. 14, 2004

(54) PORTABLE TELEPHONE

(75) Inventors: Yoshinori Matsunami, Hyogo (JP);
Hiroaki Nagano, Hyogo (JP);
Shinjirou Fukuyama, Hyogo (JP);
Mitsuru Mochizuki, Hyogo (JP);
Kazuhito Niwano, Hyogo (JP);
Hirokazu Shimizu, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 400 days.

(21) Appl. No.: 10/148,183
(22) PCT Filed: Nov. 13, 2000
(86) PCT No.: PCT/JP00/08009

§ 371 (c)(1),
(2), (4) Date: Jun. 6, 2002

(87) PCT Pub. No.: WO02/39603
PCT Pub. Date: May 16, 2002

(51) Int. Cl.$^7$ ................................................ H04B 7/00
(52) U.S. Cl. ........................................ 455/522; 455/69
(58) Field of Search ........................ 455/522, 69, 68, 455/127.2, 136, 138

(56) References Cited

U.S. PATENT DOCUMENTS

| | | | | |
|---|---|---|---|---|
| 5,081,713 A | * | 1/1992 | Miyazaki | ..................... 455/76 |
| 5,551,057 A | * | 8/1996 | Mitra | ......................... 455/522 |
| 6,377,798 B1 | * | 4/2002 | Shaffer et al. | ........... 455/426.1 |
| 6,466,772 B1 | * | 10/2002 | Rozenblit et al. | ........... 455/126 |

FOREIGN PATENT DOCUMENTS

| | | |
|---|---|---|
| EP | 1026833 | 8/2000 |
| JP | 2000-224104 | 8/2000 |
| JP | 2000-278147 | 10/2000 |

* cited by examiner

Primary Examiner—Nick Corsaro
Assistant Examiner—Tan Trinh
(74) Attorney, Agent, or Firm—Oblon, Spivak, McClelland, Maier & Neustadt, P.C.

(57) ABSTRACT

In a mobile phone according to the invention, a sum of a power control amount ($\Delta P$) instructed by a base station and a sending power (Px) detected by a sending power detecting portion (15) obtained to calculate a sending power (Px') for a next slot (S1–S3), it is determined whether the sending power (Px') is equal to or lower than a maximum sending power (Pmax) or not (S4), a power control is performed in accordance with an instruction of the base station when a relationship of (Px'≦Pmax) is present (S5), a value X satisfying (Px'−X≦Pmax) is calculated when the relationship of (Px'≦Pmax) is not present (S6), and the sending power is changed by ($\Delta P$−X) (S7).

7 Claims, 7 Drawing Sheets

PORTABLE TELEPHONE

TECHNICAL FIELD

The present invention relates to mobile phone, and particularly relates to a mobile phone for controlling a sending power in accordance with an instruction applied from a base station.

BACKGROUND ART

Conventionally, a sending power of a mobile phone is controlled to take an optimum value in accordance with a position and others of the mobile phone so that communication with a base station can be performed without impeding communication between other mobile phones and base stations. Further, the maximum sending power is restricted not to exceed a predetermined value (e.g., 25 dBm).

The sending power of mobile phone is controlled in two stages for open loop control and inner loop control. In the open loop control, the mobile phone calculates a required sending power based on a receiving power, and starts sending with the calculated power. In the inner loop control, the base station gives the mobile phone an instruction for increasing or decreasing the sending power in accordance with changes in position of the mobile phone and others. In the inner loop control, the sending power is also increased or decreased for reasons on the mobile phone side (e.g., DTX).

FIG. 8 is a flowchart representing inner loop control of a conventional mobile phone. In FIG. 8, a mobile phone calculates a power control amount $\Delta P$ in a step S51 based on, e.g., signals sent from a base station, and detects a sending power Px of a current or present slot in a step S5 for determining in a step S53 whether sending power Px is equal to or smaller than a predetermined threshold power Plim or not. When it is determined in step S53 that sending power Px is equal to or smaller than predetermined threshold power Plim, the sending power of the next slot is increased or decreased by $\Delta P$ in a step S54. When it is determined in step S53 that sending power Px is larger than predetermined threshold power Plim, the power control is not performed.

FIG. 9 is a time chart representing by way of example the inner loop control of the mobile phone already described with reference to FIG. 8. In FIG. 9, an allowed maximum sending power is in a range Pmaxr from 21 dBm to 25 dBm, a maximum sending power Pmax is equal to 25 dBm, and threshold power Plim is set to 23 dBm. FIG. 9 represents a case where a mobile phone receives an instruction for every slot from a base station to increase the sending power by 1 dB. When sending power Px exceeds threshold power Plim of 23 dBm, the mobile phone does not increase the sending power even if the base station provides the instruction to increase the sending power. This prevents sending power Px from exceeding maximum sending power Pmax.

In the case shown in FIG. 9, no problem occurs as long as the base station instructs the mobile phone to increase sending power Px by 1 dB or 2 dB. However, sending power Px will exceed maximum sending power Pmax when an instruction for increasing sending power Px by 3 dB or more is provided. Alternatively, if threshold power Plim is set to a low value, it is possible to prevent sending power Px from exceeding maximum sending power Pmax. However, this reduces a communication-allowed range because sending power Px is set to a lower value.

DISCLOSURE OF THE INVENTION

Accordingly, a major object of the invention is to provide a mobile phone, which has a sending power not exceeding a maximum sending power, and also has a large communication-allowed range.

For achieving the above object, the invention provides a mobile phone including a receiving portion for receiving a signal from a base station; a sending portion capable of control of a sending power for sending a signal to the base station; a power calculating portion for determining a power increase amount of a next slot based on a power control command or the like applied from the base station via the receiving portion; a determining portion for obtaining a first sum of the sending power of a current slot and the power increase amount determined by the power calculating portion, and determining whether the first sum is smaller than a predetermined maximum sending power or not; and a power control portion for increasing the sending power of the next slot of the sending portion by the power increase amount obtained by the power calculating portion when the determining portion determines that the first sum is smaller than the maximum sending power, and for calculating the power increase amount providing the sending power of the sending portion not exceeding the maximum sending power, and increasing the sending power of the next slot of said sending portion by the calculated power increase amount when the determining portion determines that the first sum exceeds the maximum sending power.

As a major advantage of the invention, when it is determined that the sending power will exceed the maximum sending power if the sending power is increased by the power increase amount determined based on, e.g., power control commands applied from the base station, the calculation is made to provide the sending power not exceeding the maximum sending power, and the sending power is increased only by the calculated power increase amount. Therefore, the sending power does not exceed the maximum sending power. The sending power can be equal to the maximum sending power when necessary. This increases a communication-allowed range as compared with a conventional structure, in which the set sending power is relatively low.

Preferably, the sending portion includes a variable gain amplifier/attenuator for amplifying or attenuating a send signal with a gain according to a control signal. The mobile phone further includes a storage portion for storing a table or a function representing a relationship between the control signal and the sending power of the sending portion. The power control portion controls the sending power of the sending portion by applying the control signal to the variable gain amplifier/attenuator based on the table or function stored in the storage portion. This structure allows each control of the sending power.

More preferably, the mobile phone includes a power detecting portion for detecting the sending power of the sending portion, and the sending power of the current slot used in the determining portion is detected by the power detecting portion.

Preferably, the power detecting portion has a predetermined power detection range, and a lower limit of the power detection range is set to a value lower than the maximum sending power by a value equal to or larger than a maximum value of the power increase amount obtained by the power calculating portion. The power control portion increases the sending power of the sending portion by the power increase amount determined by the power calculating portion independently of results of determination of the determining portion when the sending power of the sending portion is outside the power detection range of the power detecting portion. This can reduce the power detection range of the power detecting portion so that the detection accuracy of the power detecting portion can be improved, and the structure can be simplified.

Preferably, the power detecting portion has a predetermined power detection range. When the sending power of the sending portion is outside the power detection range of the power detecting portion, the determining portion obtains a second sum of the sending power of the sending portion determined from the control signal, a maximum value of an error in the sending power and the power increase amount of the next slot obtained by the power calculating portion, and determines whether the second sum is smaller than the maximum sending power or not. The power control portion increases the sending power of the sending portion by the power increase amount obtained by the power calculating portion when the second sum is smaller than the maximum sending power according to the determination of the determining portion. The power control portion calculates the power increase amount providing the sending power of the sending portion not exceeding the maximum sending power, and increases the sending power of the sending portion by the calculated power increase amount when the second sum is larger than the maximum sending power according to the determination of the determining portion. This structure can further reduce the power detection range of the power detecting portion so that the detection accuracy of the power detecting portion can be further improved, and the structure can be further simplified.

Preferably, the mobile phone further includes a temperature detecting portion for detecting a temperature of the power detecting portion, and a first correcting portion for correcting a detected value of the power detecting portion based on the results of detection of the temperature detecting portion.

More preferably, the mobile phone further includes a frequency detecting portion for detecting a send frequency of the sending portion, and a second correcting portion for correcting the detected value of the power detecting portion based on the results of detection of the frequency detecting portion.

BEST MODE FOR CARRYING OUT THE INVENTION

Figure 1:
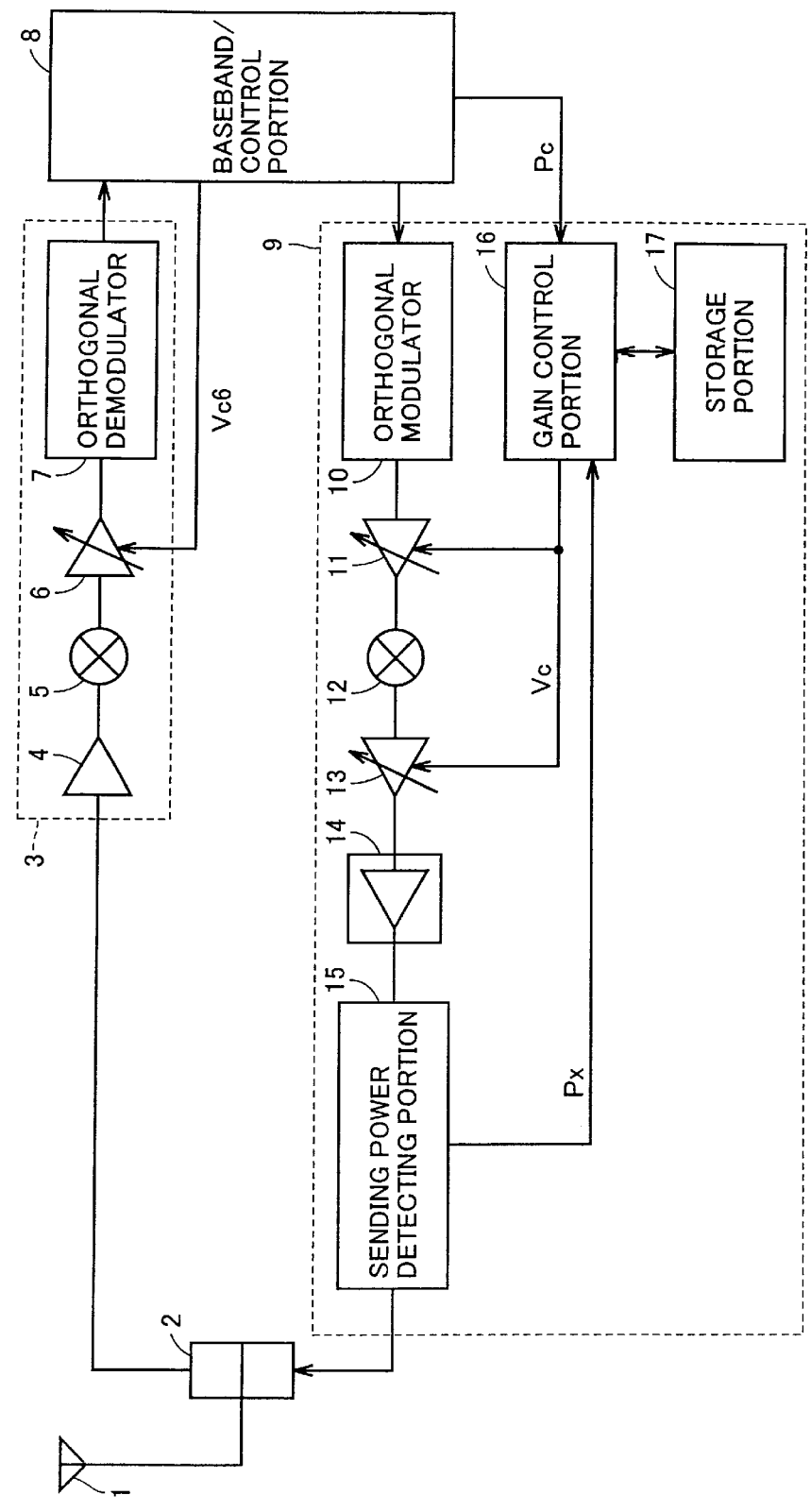
FIG. 1 is a block diagram showing a major portion of the mobile phone according to a first embodiment of the invention.

FIG. 1 is a block diagram showing a major portion of a mobile phone using a W-CDMA format according to an embodiment of the invention. In FIG. 1, the mobile phone includes an antenna 1, a duplexer 2, a receiving portion 3, a baseband/control portion 8 and a sending portion 9.

A high-frequency signal, which is sent from a base station and is received by antenna 1, is supplied to receiving portion 3 via duplexer 2. Duplexer 2 is provided for preventing input of a received signal into sending portion 9 as well as input of a send signal into receiving portion 3. Receiving portion 3 includes a low-noise amplifier 4, a mixer 5, a variable gain amplifier 6 and an orthogonal demodulator 7.

The high-frequency signal supplied to receiving portion 3 is amplified by low-noise amplifier 4, and is applied to mixer 5. Mixer 5 mixes the received high-frequency signal and an output signal of a local oscillator (not shown) to produce an IF signal. The IF signal is amplified by variable gain amplifier 6 to a predetermined power, and is applied to orthogonal demodulator 7. Baseband/control portion 8 produces a control voltage Vc6 of variable gain amplifier 6.

Orthogonal demodulator 7 demodulates the IF signal to produce and apply a baseband signal to baseband/control portion 8. The baseband signal is demodulated and converted into a digital signal by baseband/control portion 8, and is further processed to produce an audio signal.

Conversely, the audio signal or the like is subjected to predetermined processing, and is converted thereby into a digital signal, which is then demodulated and converted into a baseband signal by baseband/control portion 8. The baseband signal thus produced is input to sending portion 9. Sending portion 9 includes an orthogonal modulator 10, variable gain amplifiers 11 and 13, a mixer 12, a high-power amplifier 14, a sending power detecting portion 15, a gain control portion 16 and a storage portion 17.

The baseband signal supplied to sending portion 9 is modulated and converted into the IF signal by orthogonal modulator 10. The IF signal is amplified by variable gain amplifier 11, and is applied to mixer 12. Mixer 12 mixes the received IF signal and an output signal of a local oscillator (not shown) to produce a high-frequency signal. The high-frequency signal is amplified by variable gain amplifier 13 and high-power amplifier 14, and is sent to the base station via sending power detecting portion 15, duplexer 2 and antenna 1.

Sending power detecting portion 15 detects a power of the high-frequency signal, and applies a detected value Px to gain control portion 16. Storage portion 17 stores a table representing a relationship between a sending power Pout and a control voltage Vc of variable gain amplifiers 11 and 13. Gain control portion 16 reads out an intended value of control voltage Vc from storage portion 17 in accordance with a power control signal Pc sent from baseband/control portion 8 and detected value Px of the sending power applied from sending power detecting portion 15, and applies control voltage Vc of the value thus read to variable gain amplifiers 11 and 13 for controlling the sending power.

Description will now be given on a manner of controlling the sending power of the mobile phone. For communication with the base station, open loop control is first performed. More specifically, baseband/control portion 8 produces control voltage Vc6 of variable gain amplifier 6 so that the baseband signal of a predetermined power may be input. Based on control voltage Vc6 thus produced, the receiving power applied from the base station is calculated, and the required sending power is calculated based on the receiving power. As the receiving power decreases, the required sending power increases. As the receiving power increases, the required sending power decreases. The sending power is set to a required minimum power so as not to interfere with communication of other mobile phones. Allowed range Pmaxr of the maximum sending power is determined to be between 24 dBm−3 *dB* and 24 dBm+1 dB.

Baseband/control portion 8 applies power control signal Pc indicating the calculated sending power to gain control portion 16. Gain control portion 16 reads out a value of control voltage Vc corresponding to signal Pc, and applies control voltage Vc of the value thus read to each of variable gain amplifiers 11 and 13. Baseband/control portion 8 waits for return of a reception acceptance signal from the base station. When the reception acceptance signal is not returned, baseband/control portion 8 increases the sending power by a predetermined power, and will repeat this increase until the reception acceptance signal is returned. When the base station returns the reception acceptance signal, the open loop control ends, and the inner loop control starts.

According to the inner loop control, the base station instructs the mobile phone to increase or decrease the sending power. This is done for correcting the sending power when the communication conditions change, e.g., due to movement of a user of the mobile phone. The control amount, by which the sending power is increased or decreased, can be selected from three kinds of values, i.e., ±1 dB, ±2 dB and ±3 dB. Also, DTX control may be performed such that the sending power is decreased by several decibels when a voice disappears during voice communication. The sending power is also changed by several decibels when an information rate (□) changes. In the inner loop control, power control signal Pc applied from baseband/control portion 8 to gain control portion 16 forms a signal indicating an amount of increase/decrease of the sending power.

Figure 2:
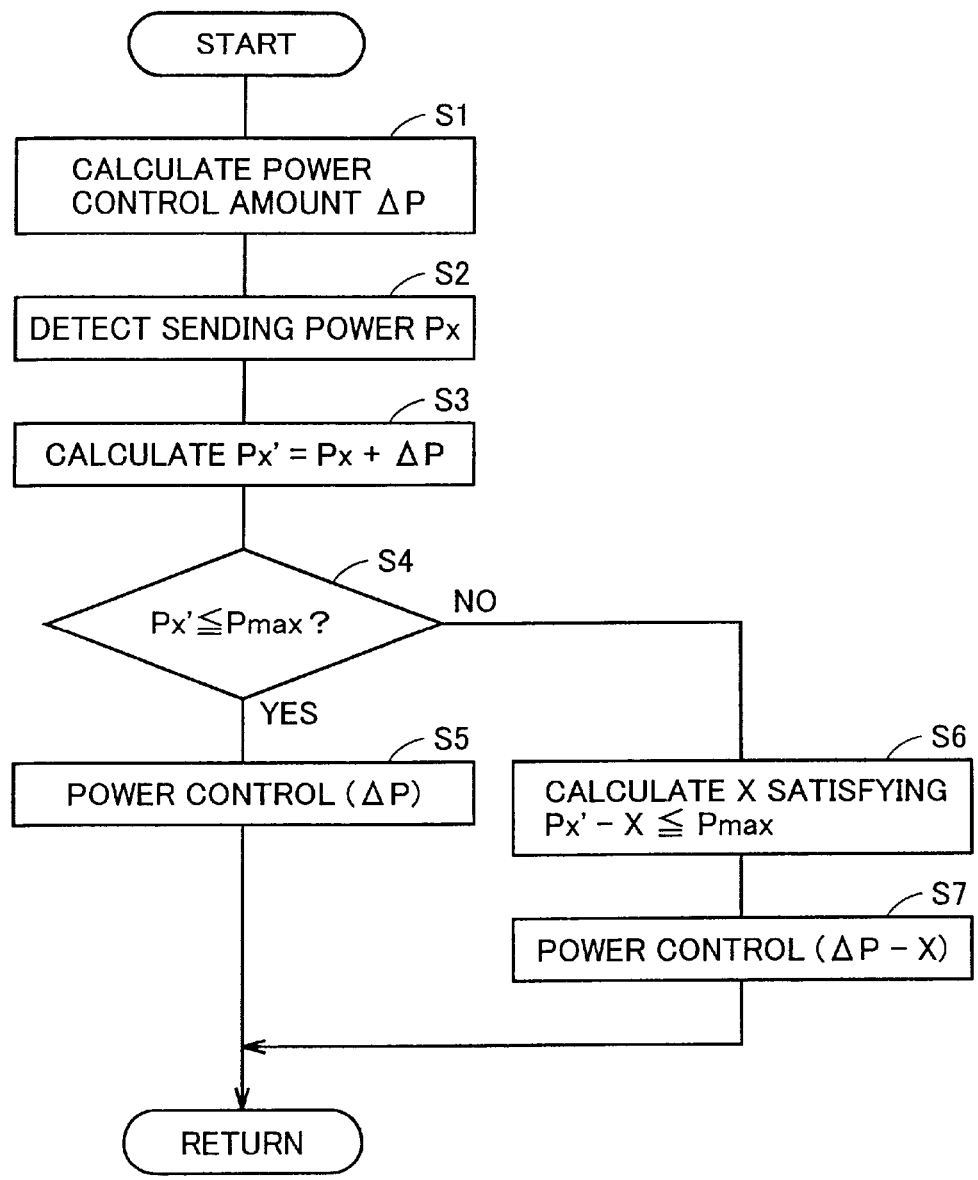
FIG. 2 is a flowchart representing inner loop control of the mobile phone shown in FIG. 1.

FIG. 2 is a flowchart showing the inner loop control of the mobile phone shown in FIG. 1. Gain control portion 16 calculates an increase/decrease amount, i.e., a power control amount ΔP of the sending power based on power control signal Pc sent from baseband/control portion 8. Then, gain control portion 16 detects sending power Px of the current slot by sending power detecting portion 15 in a step S2, calculates a sending power Px'(=Px+ΔP) of the next slot in a step S3, and determines in a step S4 whether sending power Px' is equal to or lower than maximum sending power Pmax or not. When it is determined in step S4 that sending power Px' is equal to or smaller than maximum sending power Pmax, gain control portion 16 controls and changes control voltage Vc of variable gain amplifiers 11 and 13 by ΔP in a step S5.

When gain control portion 16 determines in step S4 that sending power Px' is larger than maximum sending power Pmax, a value X satisfying a relationship of (Px'−X≦Pmax) is calculated in a step S6, and control voltage Vc of variable gain amplifiers 11 and 13 is controlled in a step S7 to change the sending power by (ΔP−X). The foregoing steps S1–S7 are executed for every slot.

Figure 3:
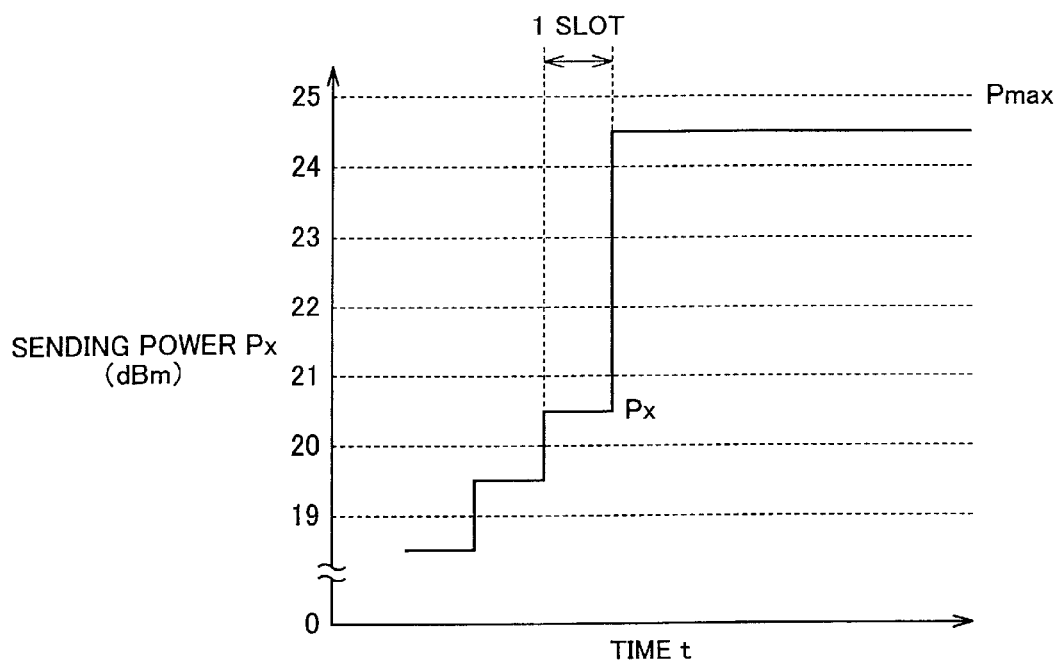
FIG. 3 is a time chart showing an example of inner loop control represented in FIG. 2.

FIG. 3 is a time chart representing by way of example the inner loop control of the mobile phone shown in FIGS. 1 and 2.

It is assumed that detected value P of the current or present sending power in a certain slot is equal to 20.5 dBm, and the base station provides an instruction to increase the sending power by 5 dB of the next slot. In this case, gain control portion 16 calculates sending power Px' of the next slot to obtain Px'=25.5 dBm (=20.5+5), and determines that the sending power Px' will exceed maximum sending power Pmax=25 dBm. Thereby, gain control portion 16 calculates value X (e.g., equal to 1) satisfying the relationship of (25.5−X≦25), and increases the sending power by 4 dB (=5−1) of the next slot.

According to this embodiment, therefore, the sending power does not exceed the maximum sending power Pmax. Further, the sending power can be substantially equal or close to maximum sending power Pmax so that the communication-allowed range of the mobile phone can be increased as compared with a conventional structure, in which the sending power is set to a low value.

In this embodiment, variable gain amplifiers 11 and 13 amplify the sending power for controlling the sending power. Alternatively, a variable gain attenuator may be employed to attenuate the send signal for controlling the sending power. Storage portion 17 stores a table representing the relationships between the sending power Pout and control voltage Vc of variable gain amplifiers 11 and 13. However, storage portion 17 may store functions representing such relationships instead of the table, in which case gain control portion 16 obtains control voltage Vc based on power control signal Pc, detected power value Px and such functions.

Modifications of the embodiment will now be described. A modification shown in FIG. 4 employs steps S21 and S22 in addition to those in FIG. 2. The detection range of sending power detecting portion 15 cannot be increased infinitely, and is restricted to a certain range. As this detection range is reduced, the sending power can be detected more accurately, and the structure of sending power detecting portion 15 can be further simplified. In this modification, therefore, a difference (Pmax−Pa) between maximum sending power Pmax and lower limit Pa of detection range (Pa–Pb) of sending power detecting portion 15 is set to a value substantially equal to or slightly larger than the maximum change amount, by which the sending power can be increased at a time.

Gain control portion 16 detects sending power Px by sending power detecting portion 15 in step S2, and determines in next step S21 whether sending power Px falls within the detection range between Pa–Pb or not. When it is determined in step S21 that a relationship of (Pa≦Px≦Pb) is satisfied, gain control portion 16 executes steps S3–S7 already described in FIG. 2. When it is determined in step S21 that the relationship of (Pa≦Px≦Pb) is not satisfied, gain control portion 16 increases or decreases the sending power of the next slot by ΔP in step S22. It is assumed that the sending power does not exceed Pb because performances of amplifiers 11, 13 and 14 and others restrict such exceeding.

Figure 4:
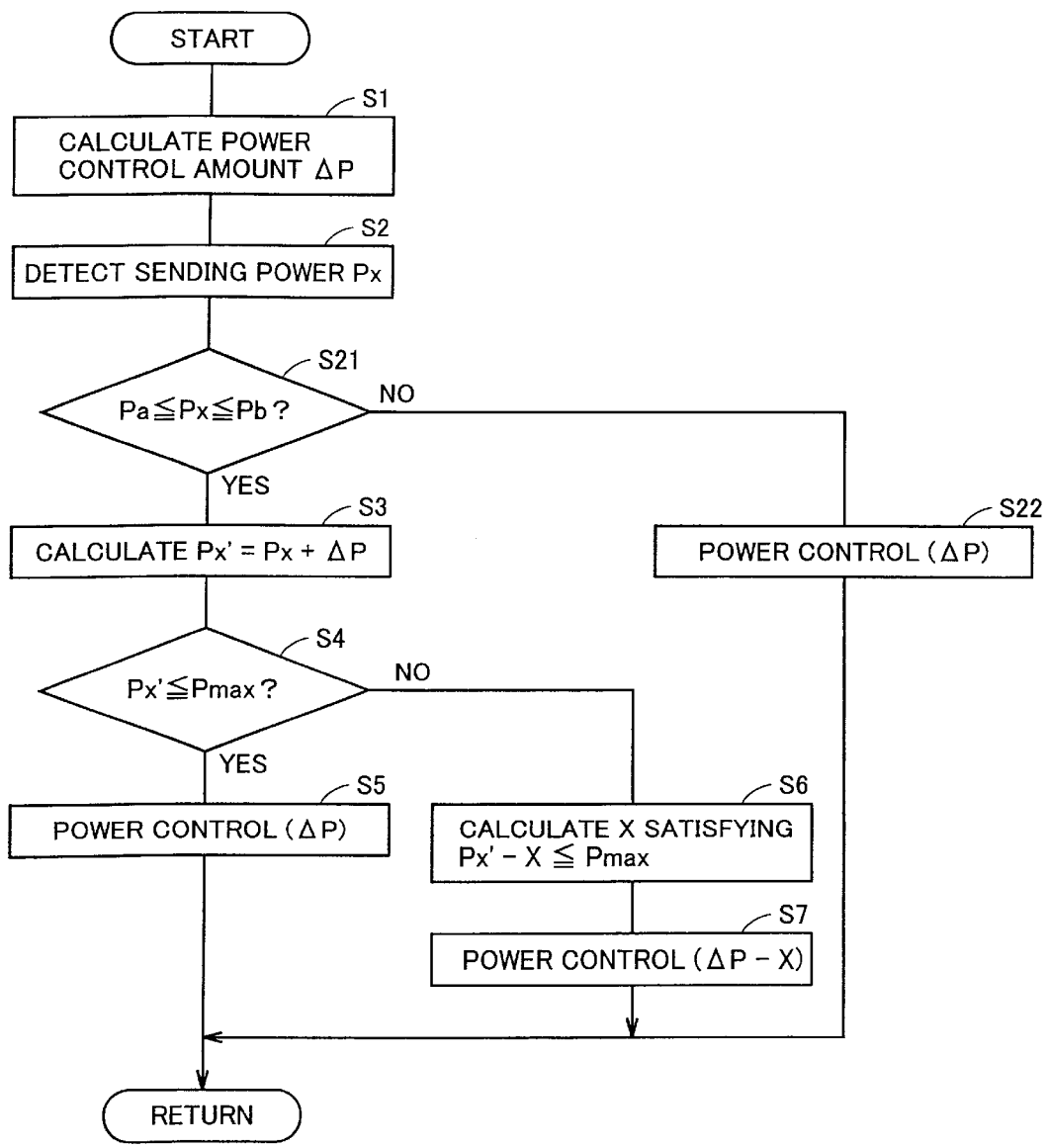
FIG. 4 is a flowchart representing a modification of the embodiment.
Figure 5:
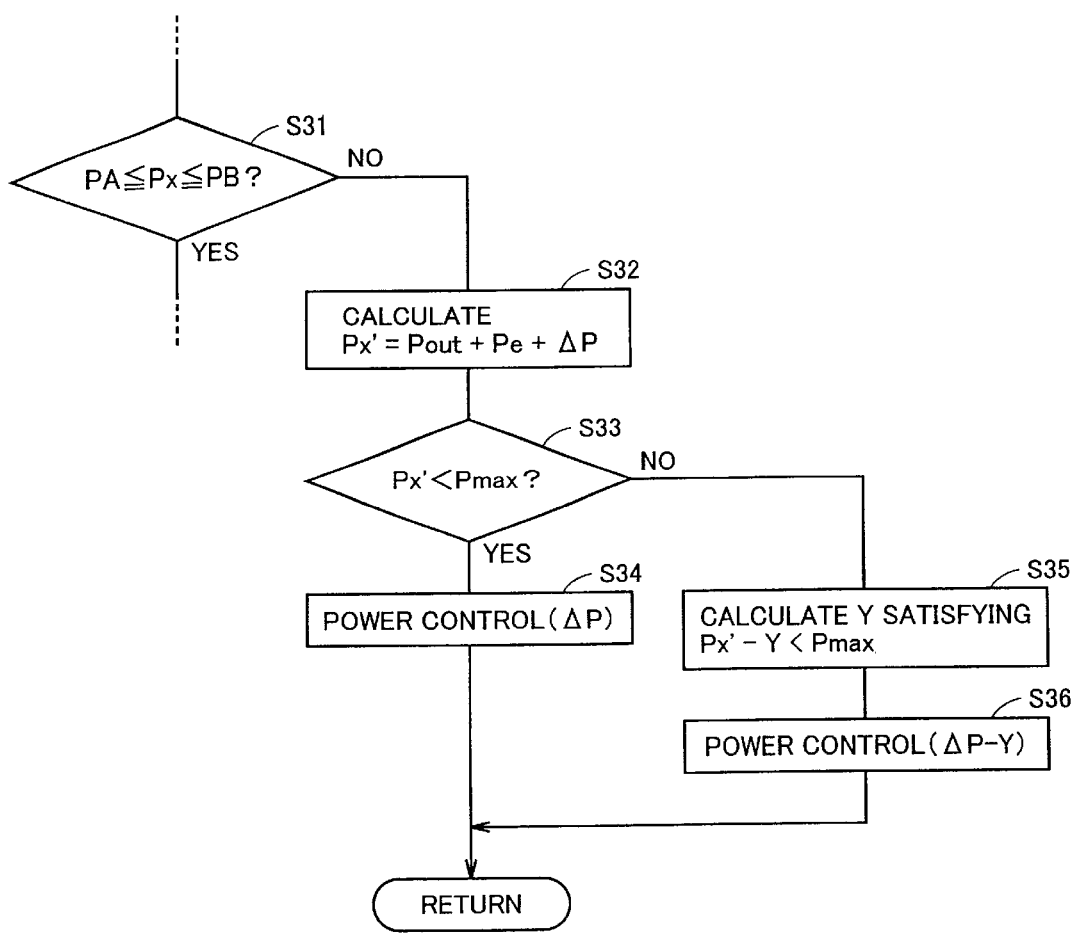
FIG. 5 is a flowchart representing another modification of the embodiment.

In a modification shown in FIG. 5, a step S31 is employed instead of step S21 in the modification shown in FIG. 4, and steps S32–S36 are employed instead of step S22 in FIG. 4. Further, a detection range between PA and PB of sending power detecting portion 15 is smaller than the detection range between Pa–Pb in the modification shown in FIG. 4. More specifically, there is a relationship of (Pa<PA<Pmax≦PB≦Pb). This is because the narrower detection range allows more accurate detection of the sending power in the detection range, and can simplify the structure of sending power detecting portion 15. In this modification, therefore, gain control portion 16 determines in step S31 whether a relationship of (PA≦Px≦PB) is satisfied. When it is determined that the relationship of (PA≦Px≦PB) is not satisfied, sending power Px'(=Pout+Pe+ΔP) of the next slot is calculated in step S32, and it is determined in step S33 whether the sending power Px' is equal to or lower than maximum sending power Pmax or not. In the above formula, Pout represents the sending power of the current slot determined from control voltage Vc, and Pe represents a maximum value of an error in Pout.

When gain control portion 16 determines in step S33 that a relationship of (Px'≦Pmax) is satisfied, it increases or decreases the sending power of the next sending power by ΔP in step S34. When gain control portion 16 determines in step S33 that the relationship of (Px'≦Pmax) is not satisfied, it calculates a value Y satisfying a relationship of (Px'−Y≦Pmax) in step S35, and increases the sending power by (ΔP−Y) in step S36.

Figure 6:
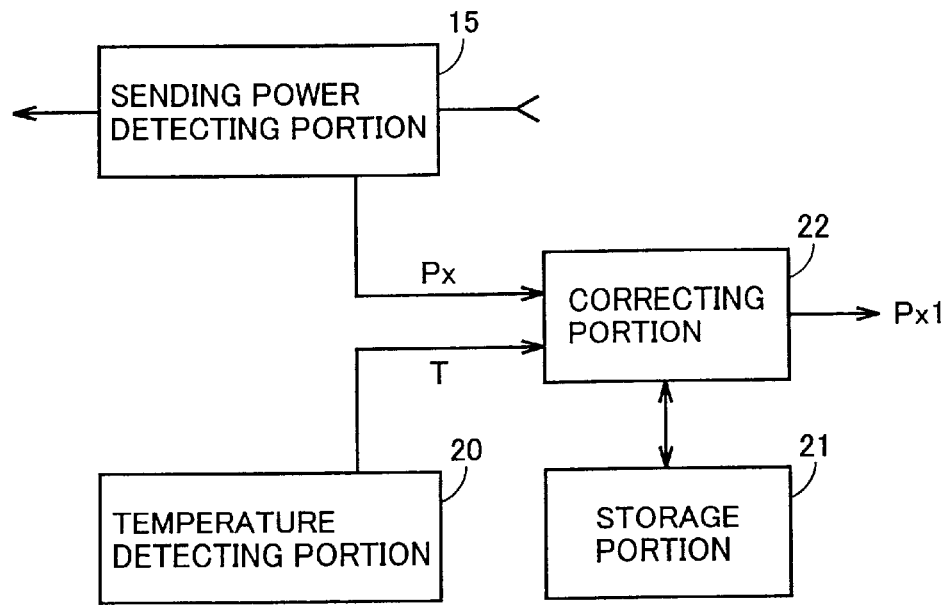
FIG. 6 is a flowchart representing still another modification of the embodiment.

A modification shown in FIG. 6 employs a temperature detecting portion 20, a storage portion 21 and a correcting portion 22 added to sending power 9 shown in FIG. 1. Temperature detecting portion 20 detects a temperature T of sending power detecting portion 15. The detected value Px of sending power detecting portion 15 changes with temperature T. Therefore, storage portion 21 stores a table or functions representing relationships between temperature T and detected power value Px. Correcting portion 22 obtains a correction value of the detected power value based on temperature T of sending power detecting portion 15 detected by temperature detecting portion 20 and the table or functions stored in storage portion 21, and adds the correction value to detected power value Px. A detected power value Px×1 thus corrected is applied to gain control portion 16 instead of value Px. In this modification, since detected power value Px is corrected based on temperature T, the sending power can be detected more accurately.

Figure 7:
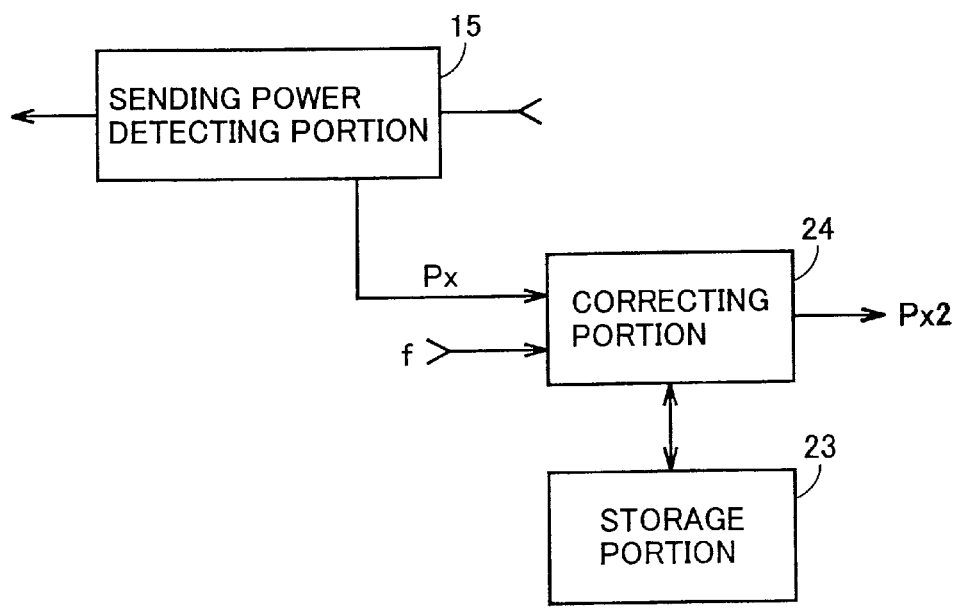
FIG. 7 is a flowchart representing yet another modification of the embodiment.
Figure 8:
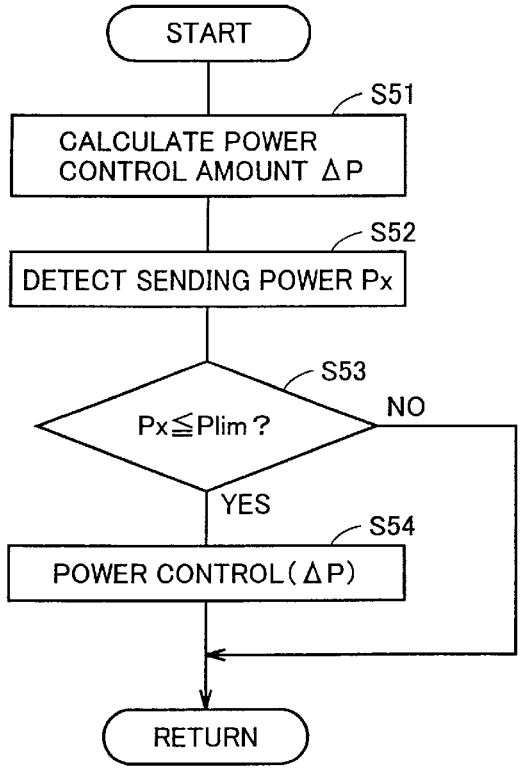
FIG. 8 is a flowchart representing inner loop control of a conventional mobile phone.
Figure 9:
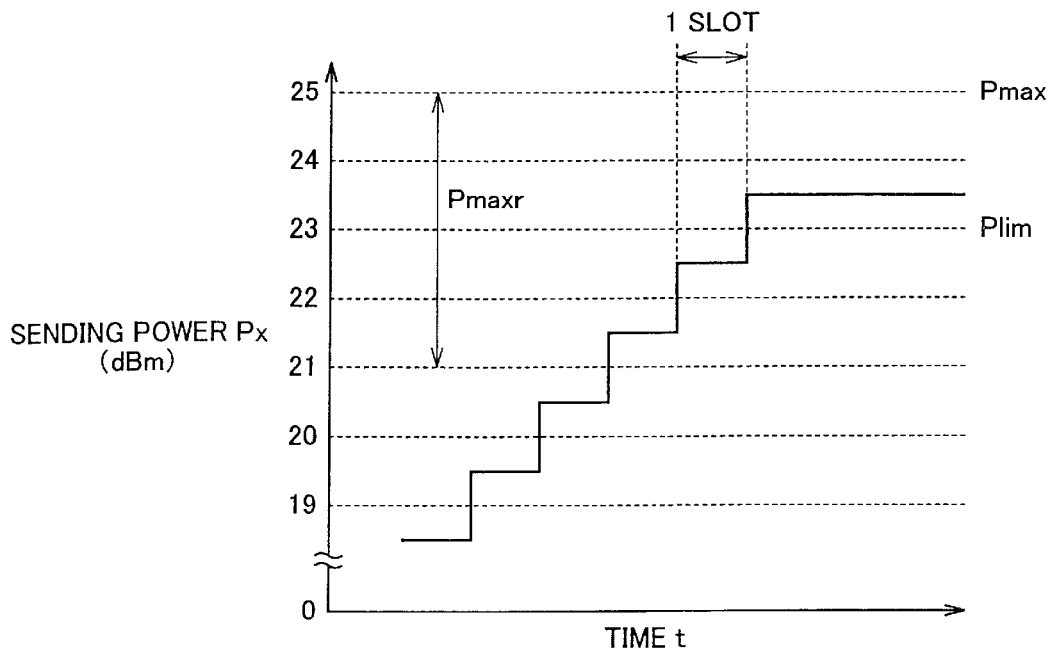
FIG. 9 is a time chart representing an example of the inner loop control shown in FIG. 8.

In a modification shown in FIG. 7, a storage portion 23 and a correcting portion 24 are added to sending portion 9 in FIG. 1. Detection value Px of sending power detecting portion 15 changes with a send frequency f. Accordingly, storage portion 23 stores a table or functions representing relationships between send frequency f and the correction value of detected power value Px. Send frequency f is detected by baseband/control portion 8 in FIG. 1. Correcting portion 24 obtains the correction value of the detected power value based on send frequency f detected by baseband/control portion 8 and the table or functions stored in storage portion 23, and adds the correction value to detected power value Px. Detected power value Px2 thus corrected is applied to gain control portion 16 instead of Px. In this modification, detected power value Px is corrected based on send frequency f so that the sending power can be detected more accurately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile phone comprising:
    a receiving portion (3, 8) for receiving a signal from a base station;
    a sending portion (10–14) capable of control of a sending power for ending a signal to said base station;
    a power calculating portion (16, S1) for determining a power increase amount (ΔP) of a next slot based on a power control command or the like applied from said base station via said receiving portion (3, 8);
    a determining portion (16, S2–S4) for obtaining a first sum (Px+Δof the sending power (Px) of a current slot and the power increase amount (ΔP) determined by said power calculating portion (16, S1), and determining whether said first sum (Px+ΔP) is smaller than a predetermined maximum sending power (Pmax) or not; and a power control portion (16, S5–S7) for increasing the sending power of the next slot of said sending portion (10–14) by the power increase amount (ΔP) obtained by said power calculating portion (16, S1) when said determining portion (16, S2–S4) determines that said first sum (Px+ΔP) is smaller than said maximum sending power (Pmax), and for calculating the power increase amount (ΔP−X) providing the sending power of said sending portion (10–14) not exceeding said maximum sending power (Pmax), and increasing the sending power of the next slot of said sending portion (10–14) by the calculated power increase amount (ΔP−X) when said determining portion (16, S2–S4) determines that said first sum (Px+ΔP) exceeds said maximum sending power (Pmax).

2. The mobile phone according to claim 1, wherein
    said sending portion (10–14) includes a variable gain amplifier/attenuator (11, 13) for amplifying or attenuating a send signal with a gain according to a control signal (Vc),
    said mobile phone further comprises a storage portion (17) for storing a table or a function representing a relationship between said control signal (Vc) and a sending power (Pout) of said sending portion (10–14), and
    said power control portion (16, S5–S7) controls the sending power (Pout) of said sending portion (10–14) by applying the control signal (Vc) to said variable gain amplifier/attenuator (11, 13) based on said table or function stored in said storage portion (17).

3. The mobile phone according to claim 2, further comprising:
    a power detecting portion (15) for detecting the sending power (Px) of said sending portion (10–14), wherein
    said sending power (Px) of said current slot used in said determining portion (16, S2–S4) is detected by said power detecting portion (15).

4. The mobile phone according to claim 3, wherein
    said power detecting portion (15) has a predetermined power detection range (Pa–Pb), and a lower limit (Pa) of said power detection range (Pa–Pb) is set to a value lower than said maximum sending power (Pmax) by a value equal to or larger than a maximum value of the power increase amount (ΔP) obtained by said power calculating portion (16, S1), and
    said power control portion (16, S5–S7, S21, S22) increases the sending power of said sending portion (10–14) by the power increase amount (ΔP) determined by said power calculating portion (16, S1) independently of results of determination of said determining portion (16, S2–S4) when the sending power of said sending portion (10–14) is lower than a lower limit (Pa) of said power detection range (Pa–Pb).

5. The mobile phone according to claim 3,
    said power detecting portion (15) has a predetermined power detection range (PA–PB);
    when the sending power of said sending portion (10–14) is outside the power detection range of said power detecting portion (15), said determining portion (16,

S31–S33) obtains a second sum (Pout+Pe+ΔP) of the sending power (Pout) of said sending portion (10–14) determined from said control signal (Vc), a maximum value (Pe) of an error in said sending power (Pout) and the power increase amount (ΔP) of the next slot obtained by the power calculating portion (16, S1), and determines whether said second sum (Pout+Pe+ΔP) is smaller than said maximum sending power (Pmax) or not; and said power control portion (16, S5–S7, S34–S36) increases the sending power of said sending portion (10–14) by the power increase amount (ΔP) obtained by said power calculating portion (16, S1) when said second sum (Pout+Pe+ΔP) is smaller than said maximum sending power (Pmax) according to the determination of said determining portion (16, S31–S33), and said power control portion (16, S5–S7, S34–S36) calculates the power increase amount (ΔP–Y) providing the sending power of said sending portion (10–14) not exceeding said maximum sending power (Pmax), and increases the sending power of said sending portion (10–14) by said calculated power increase amount (ΔP–Y) when said second sum (Pout+Pe+ΔP) is larger than said maximum sending power (Pmax) according to the determination of said determining portion (16, S31–S33).

6. The mobile phone according to claim 3, further comprising:

a temperature detecting portion (20) for detecting a temperature of said power detecting portion (15); and a first correcting portion (21, 22) for correcting a detected value (Px) of said power detecting portion (15) based on the results of detection of said temperature detecting portion (20).

7. The mobile phone according to claim 3, further comprising:

a frequency detecting portion (8) for detecting a send frequency of said sending portion (10–14), and a second correcting portion (23, 24) for correcting the detected value (Px) of said power detecting portion (15) based on the results of detection of said frequency detecting portion (8).

* * * * *

UNITED STATES PATENT AND TRADEMARK OFFICE
CERTIFICATE OF CORRECTION

PATENT NO.    : 6,832,098 B1
DATED         : December 14, 2004
INVENTOR(S)   : Yoshinori Matsunami et al.

It is certified that error appears in the above-identified patent and that said Letters Patent is hereby corrected as shown below:

Column 5,
Line 30, change "an information rate (□)" to -- an information rate (ß) --.

Column 7,
Line 66, change "(Px + Δ" to -- (Px + Δ P) --

Signed and Sealed this

Nineteenth Day of July, 2005

JON W. DUDAS
*Director of the United States Patent and Trademark Office*